Jan. 7, 1964
J. H. COWLES ETAL
3,116,747
UNITARY RUPTURABLE CHECK VALVE
Filed June 5, 1961
2 Sheets-Sheet 1
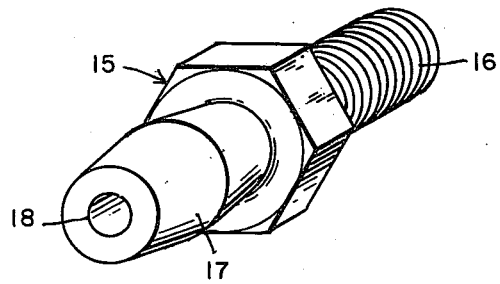
FIG. 1.
FIG. 3.
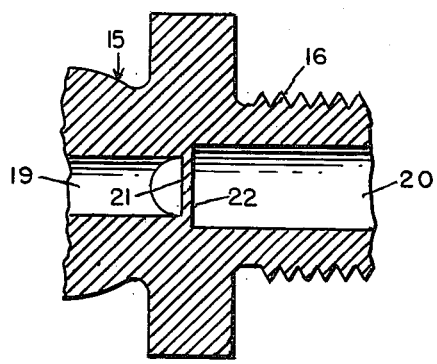
FIG. 2.
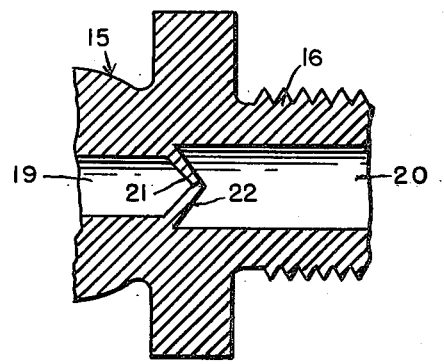
FIG. 4.
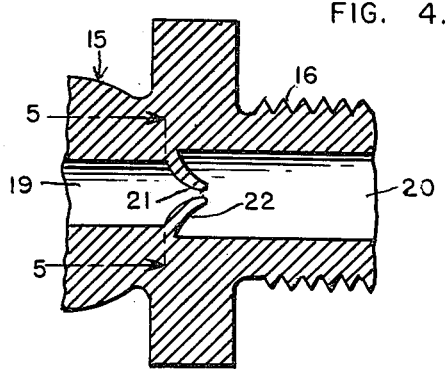
FIG. 5.
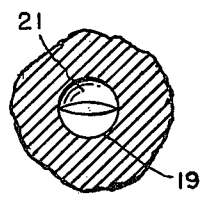
JOHN H. COWLES
CARL F. BENSON
INVENTORS
BY Mason, Porter, Diller + Steward
ATTORNEYS Jan. 7, 1964   J. H. COWLES ETAL   3,116,747
UNITARY RUPTURABLE CHECK VALVE
Filed June 5, 1961   2 Sheets-Sheet 2

JOHN H. COWLES
CARL F. BENSON
INVENTORS

BY Mason, Porter, Miller + Stewart
ATTORNEYS

United States Patent Office 3,116,747
Patented Jan. 7, 1964

3,116,747
UNITARY RUPTURABLE CHECK VALVE
John H. Cowles and Carl F. Benson, Torrington, Conn., assignors to The Torrington Company, Torrington, Conn., a corporation of Maine
Filed June 5, 1961, Ser. No. 114,810
4 Claims. (Cl. 137—68)

The following description has reference to improvements in a unitary check valve suitable for use wherever a stream of fluent material such as water, oil, grease, air and other gases, are being passed through a passageway such as a tube, pipe and the like.

With the advance in the use of molded plastics, it is now possible by this invention to produce an improved valve assembly from such material as a unitary structure. This has advantages in that the valve assembly can be readily manufactured to accurate dimensions, will serve as a seal until fluid pressure is applied and thereafter will form a check valve with accurately mating valve faces.

One of the objects of our invention is to produce a one-piece valve assembly of resilient material, such as plastics.

A further object of the invention is to make a valve assembly which will be inert to corrosive fluids and gases by reason of the use of synthetic or natural plastics.

A still further object of the invention is the ability to produce the improved valve assembly by molding in one operation such as injection or the like.

Another object of the invention is to produce a valve assembly which will serve as an integral closure until such time as fluid pressure is applied.

Among the objects of the invention is to produce, from the plastic material, a resilient self-sealing closure without giving special treatment to the valve surfaces.

These and other objects of the invention will be evident from the following description and the illustration of the preferred forms thereof as shown in the accompanying drawings in which FIG. 1 is a perspective view of a grease fitting or the like incorporating the improved valve;

FIG. 2 is a fragmentary longitudinal axial cross-section of the fitting;

FIG. 3 is a similar cross-section at right angles to FIG. 2;

FIG. 4 is an axial cross-section similar to FIG. 2 showing the valve open to pass fluids or gases;

FIG. 5 is a transverse section on the line 5—5 of FIG. 4;

Figure 6:
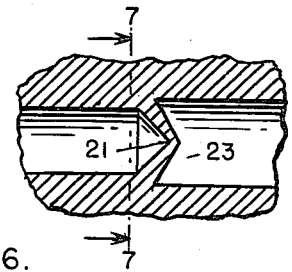
FIG. 6 is a fragmentary longitudinal axial cross-section of a modified form.

Briefly described, the invention consists in an improved check valve assembly made of resilient thermoplastics which may be molded. By one operation it is possible to make a unitary valve assembly which contains an integral valve proper. This valve, however, initially is an integral part of the closure of the assembly. It is broken open by the input of a fluid so that the valve is open to pass the fluid under pressure. Immediately on cessation of the fluid pressure, the resilience of the valve causes it to resume its closed position. In this position, the mating surfaces of the valve produced by the fracture of the material, resume original position and form an adequate seal for the valve. Moreover, such a seal is particularly effective against back pressure.

By way of example we have shown in the attached drawings, a valve assembly 15. This consists of a screwthreaded end 16 by which the assembly is attached to an opening in a wall, pipe or similar fixture for discharge into the latter.

The opposite end of the assembly comprises a nipple 17 for attachment to a pipe or other source of fluid under pressure. This may be oil, water, fluent grease, air, gas, or other desired fluid.

The assembly is made in one piece by molding from natural or synthetic rubber, or from plastics, such as polyethylene, acetal resins or like thermoplastic materials. It is essential that this plastic be capable of molding into accurate shape and having inherent resilience and frangibility at normal temperatures.

The assembly has a tubular passageway 18 extending axially. This consists of an inlet end 19 and an outlet end 20. At the juncture of the inlet and outlet, an integral partition of plastic extends across the tube from wall to wall. This is one which is adapted to be perforated, punctured or ruptured in a variety of ways.

In the form shown on FIGS. 2, 3, 4, and 5, the partition consists of two opposing lips 21, 22. These are integral with the wall of the passageway 18 on opposite sides. They meet in the center on a diametrical line where they are slightly thinner. In the initial form in which molded, the lips are sealed together. They are subject to rupture by fluid pressure on this relatively thinner diameter. The edges of the lips at this point can form perfectly mating parts of the valve. They spread apart as shown in FIG. 5 to allow passage of pressure fluid from the inlet to the outlet. However, on the failure of pressure, the lips close to the original position to form a check valve against inadvertent leakage or back pressure.

Figure 7:
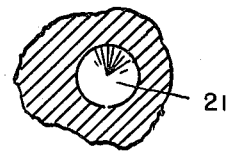
FIG. 7 is a similar transverse section on the line 7—7 of FIG. 6.
Figure 8:
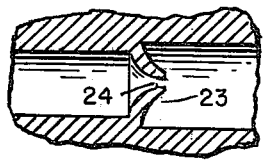
FIG. 8 is a view similar to FIG. 6 showing the valve open.

Referring to FIGS. 6, 7 and 8, there is shown a modified form of the invention. In this instance, the partition 23 is in the form of a hollow cone, the base of which is integral with the circular side of the tubular wall.

Here again the apex 24 of the cone is slightly thinner than the partition in general. This apex is punctured by the pressure of the incoming fluid. This causes the partition to distend and allow the passage of fluid. On stoppage of the flow, the puncture in the apex closes and the valve is then a check against back pressure.

Figure 9:
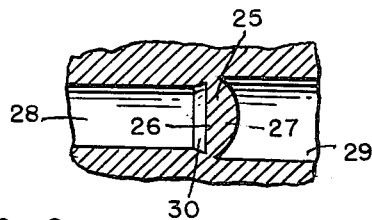
FIG. 9 is a fragmentary longitudinal axial cross-section of a further modified form.
Figure 10:
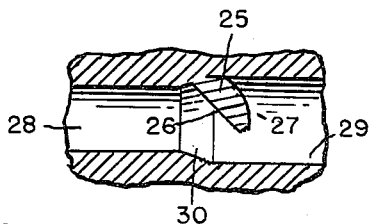
FIG. 10 is a similar view showing the valve open.

FIGS. 9 and 10 illustrate the invention in the form of a flap valve 25. This has a flat front face 26, but the rear 27 is part spherical to improve resistance against pressure.

In this modification, the inlet 28 is of less diameter than the outlet 29. In its initial form the valve 25 is integral with the conical valve seat 30 between the inlet and the outlet. The valve 25 has its widest contact on a relatively small portion of the circumference of the tubular wall. This serves as a hinge when the valve is forced open. While the remainder of the periphery of the valve initially is integral with the inner wall of the conical seat 30, it is easily severed to form mating edges which will close effectively, but will open under pressure to allow the pressure of fluid.

In this instance also, collapse of pressure closes the valve against back pressure. The arcuate form of the back of the valve proper, increases the closing pressure due to the shape and the increased cross-section relative to that of the inlet 28.

Figure 11:
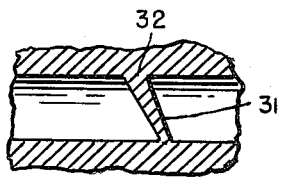
FIG. 11 is a fragmentary longitudinal axial cross-section of a still further modification.
Figure 12:
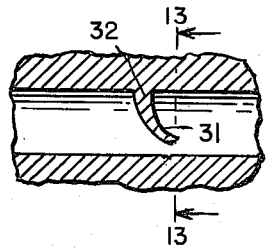
FIG. 12 is a similar view of the valve in open position.
Figure 13:
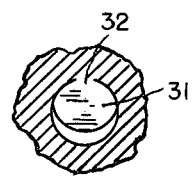
FIG. 13 is a transverse cross-section on the line 13—13 of FIG. 12.

Another modification of the invention is shown in FIGS. 11, 12 and 13, where a different form of flap valve 31 is provided. In this case it is a flat, diagonally disposed partition. It is thick on one side to provide a hinge 32. The balance of the periphery is thinner. It also is sealed initially to the side wall of the tubular passageway. However, the introduction of fluid pressure will rupture the partition at its juncture with the tubular wall at all points other than the thickened hinge. This permits the valve 31 to open by its resilience. Again, collapse of inlet pressure serves to close the partition and seal the passageway against back pressure.

In all of the forms illustrated, a valve assembly is provided which can be molded to accurate form in one operation. It then forms an integral closure. However, introduction of fluid under pressure on the inlet side of each valve serves to rupture, fracture or puncture the valve proper. It thus gives way to allow passage of the fluid. Whenever the pressure is equalized on opposite sides of the partition or valve proper, and when back pressure exists, the valve resumes its initial closed position and seals off the passageway.

It will be evident from the above that the invention, while illustrated in preferred form, may be variously embodied with appropriate change in dimensions and materials within the scope of the appended claims.

What we claim is:

1. A unitary self-closing check valve of resilient plastic material having a tubular casing and a valve integrally formed with an intermediate part of the wall of the tubular casing and having a pair of lips which initially are integrally sealed together at an area of relative thinness and capable of rupture at that point by fluent pressure to form complementary valve portions which close on reduction of fluent pressure due to the resilience of the material.

2. A unitary self-closing check valve of resilient plastic material having a tubular casing and a valve integrally formed with an intermediate part of one side wall of the tubular casing and having a lip which initially is sealed integrally to the side wall with an area of relative thinness and capable of rupture at said area by fluent pressure to form with said side wall, complementary valve portions which close on reduction of fluent pressure due to the resilience of the material.

3. A unitary self-closing check valve of resilient plastic material having a tubular casing and an integral conical valve member formed with an intermediate part of the wall of the tubular casing and having a relatively thinner sealed apex subject to puncture by fluent pressure to form a valve opening with complementary portions which close together on reduction of fluent pressure due to the resilience of the material.

4. A unitary self-closing check valve comprising a tubular casing of resilient plastic material having a conical valve seat at an intermediate point and a part-spherical valve member initially sealed integrally with the inner wall of the casing at said point over a circumferential area of relative weakness, said valve member separating from the major part of said seat along said circumferential area of weakness and forming an irregular mating line by fluent pressure and closing on reduction of pressure due to the resilience of the material.

References Cited in the file of this patent

UNITED STATES PATENTS

| 15,192 | Peale | June 24, 1856 |
| 2,370,870 | McKeague | Mar. 6, 1945 |
| 2,553,267 | Nedoh | May 15, 1951 |
| 2,856,025 | Whited | Oct. 14, 1958 |
| 3,005,573 | Dawson | Oct. 24, 1961 |

FOREIGN PATENTS

| 735,590 | Great Britain | Aug. 24, 1955 |